Figure 3:
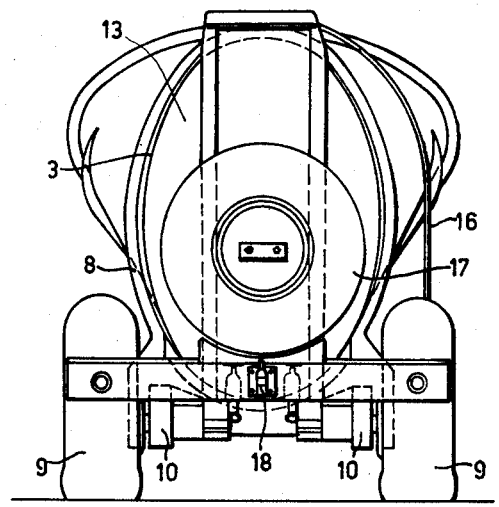

March 12, 1963  F. X. A. SCHMIERMANN  3,081,104
TANK VEHICLE OF THE SEMITRAILER TYPE
Filed May 2, 1960  2 Sheets-Sheet 1
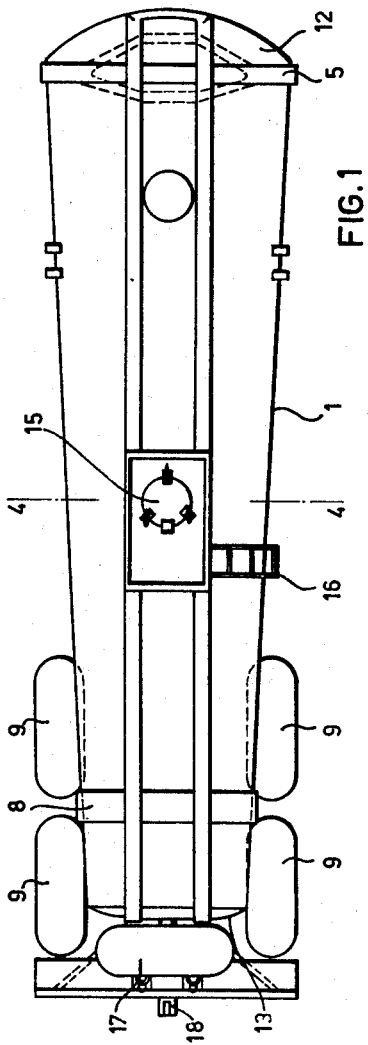
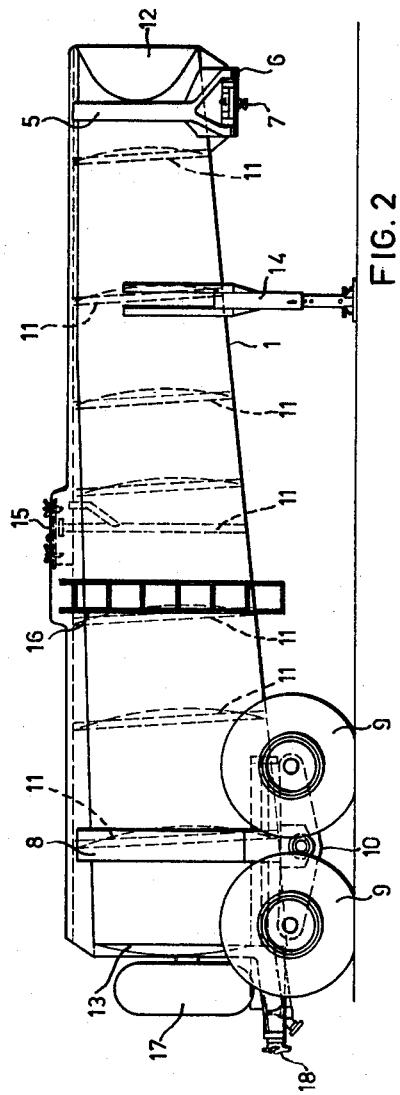
INVENTOR.
FRANCISCUS X.A. SCHMIERMANN
BY
Wenderoth, Lind + Ponack
Attys.

March 12, 1963  F. X. A. SCHMIERMANN  3,081,104
TANK VEHICLE OF THE SEMITRAILER TYPE
Filed May 2, 1960  2 Sheets-Sheet 2

INVENTOR.
FRANCISCUS X.A. SCHMIERMANN
BY
Wenderoth, Lind & Ponack
Attys.

United States Patent Office 3,081,104
Patented Mar. 12, 1963

3,081,104
TANK VEHICLE OF THE SEMITRAILER TYPE
Franciscus X. A. Schmiermann, Heeze, Netherlands, assignor to Van Doorne's Aahangwagenfabriek N.V., Eindhoven, Netherlands, a limited liability company of the Netherlands
Filed May 2, 1960, Ser. No. 25,967
Claims priority, application Netherlands May 11, 1959
6 Claims. (Cl. 280—5)

My invention relates to a tank vehicle executed as a semi-trailer and has the object to provide a tank vehicle of this kind having an efficient and inexpensive construction.

A further object of my invention is to keep the centre of gravity of the tank and thereby of the whole vehicle as low as possible, thus improving roadability.

A further object of my invention is to avoid a goose neck often applied to semi-trailer tank vehicles in which case the shape of the tank follows the goose neck resulting in a complicated and expensive form of the tank of the known vehicle of this kind.

Still another object of my invention is to provide a tank vehicle, the tank of which has a maximum capacity without necessitating steps or other irregularities of the tank body.

Still another object of my invention is to provide a tank vehicle, the rear portion of its tank extending partially between the rear wheels so as to give a large freedom of movement to said wheels in order to allow the rear wheels to follow any unevenness of the ground and at the same time to keep the centre of gravity low.

Still another object is to provide a tank vehicle, the tank body of which having a uniform circumference substantially throughout its length, so that the tank body may be composed of rectangular sheets.

Still another object of my invention is to provide a tank vehicle, the top line of its tank being substantially horizontal in the normal driving position of the vehicle and the bottom line of its tank sloping from the front portion towards the rear portion of the vehicle, a fifth wheel coupling device being secured to the front portion of the tank body and a set of rear wheels being connected with the rear portion of the tank body, the arrangement being such that the front portion of said tank body has a maximum width between said top line and said fifth wheel coupling device and has a maximum height between said top line and said bottom line.

Figure 4:
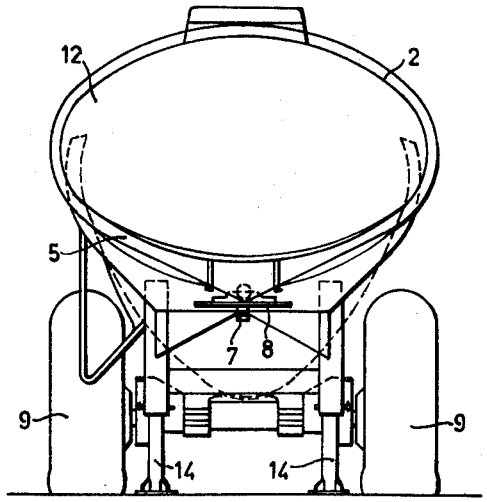

An embodiment of a tank vehicle according to my invention is shown in the drawings by way of example. In the drawings:

FIG. 1 is a top view,
FIG. 2 is a side view,
FIG. 3 is a rear view and
FIG. 4 is a front view.

The tank for the tank vehicle shown in the drawings is manufactured by starting from a tubular member 1, the circumference of the cross section being substantially equal throughout its length. This tubular member could be named a cylinder but for the fact that if it rests on the ground it would sag under its own weight to an oval section.

In order to give the desired shape to the tank, said tubular member is compressed near its front end in a vertical direction so that the front end is formed as an ellipse 2, the longer axis of which is horizontal (vide FIG. 4). Near its rear end the tubular member is compressed horizontally so that an ellipse 3 is formed (vide FIG. 3), the longer axis of which is vertical. In consequence thereof the cross section of the tank merges gradually from the front end to the rear end; between the front ellipse 2 and the rear ellipse 3 the tubular member has an intermediary cross section 4—4 in the form of a circle. This is also the section where the greatest bending moment occurs, so that a very strong construction is achieved.

Struts 5 are fixed to the exterior of the tank near its front end and connect the tank with a coupling plate 6 in the centre of which a coupling pin 7 is mounted. By means of the coupling plate 6 the front end of the tank may rest on a tractor and may be coupled therewith by means of said coupling pin 7.

Struts 8 are fixed to the tank near its rear end and connect the tank with a set of rear wheels 9. In the embodiment shown in the drawings the wheels 9 of the tandem wheel set are mounted on a rocking beam 10 which is pivotally connected to the members 8 in order to carry the rear end of the tank.

After pressing the tubular member 1 at the front end in a vertical direction and at the rear end in a horizontal direction, the tank body is kept in its shape by means of stiffening members as usual. The front end is closed by a front wall 12 and the rear end by a rear wall 13.

Further usual devices may be arranged such as a retractable support 14 on which the tank may rest if it is decoupled from the tractor, a manhole closed by a cover 15, a ladder 16, a spare wheel 17 and a draw hook 18.

It appears from the drawings that the shape of the tank is simple and efficient. The costs of manufacturing may be kept low since the tubular member from which the tank is formed may be composed of rectangular sheets. The bottom of the tank slopes gradually towards the rear end and the capacity is large without necessitating a complicated shape. As a result of the narrow section of the rear part the rear wheels 9 have a great freedom of movement so that the tank vehicle is suitable to be used on uneven ground without recesses being needed in the rear portion of the tank or without the usual necessity of arranging the rear end of the tank above the rear wheels. Since the rear portion of the tank extends to a considerable degree between the rear wheels, the centre of gravity is kept low, resulting in an improved roadability.

What I claim is:

1. A semi-trailer tank vehicle, comprising a tank having a coupling device near its front end, a set of road wheels supporting its rear end, said tank having a substantially uniform circumference throughout its length and having adjacent said coupling device an elliptical form with its major axis horizontal and at its rear end an elliptical form with its major axis vertical.

2. A semi-trailer tank vehicle, comprising a tank having a coupling device near its front end, a set of road wheels supporting its rear end, said tank having a substantially uniform circumference throughout its length and having adjacent said coupling device an elliptical form with its major axis horizontal and at its rear end an elliptical form with its major axis vertical, the cross section of said tank merging gradually from one end to the other end.

3. A semi-trailer tank vehicle, comprising a tank having a coupling device near its front end, a set of road wheels supporting its rear end, said tank having a substantially uniform circumference throughout its length and having adjacent said coupling device an elliptical form with its major axis horizontal and at its rear end an elliptical form with its major axis vertical, said rear end extending below a horizontal plane through the top of said road wheels.

4. A semi-trailer tank vehicle, comprising a tank having a coupling device near its front end, a set of road wheels supporting its rear end, said tank having a substantially uniform circumference throughout its length and having adjacent said coupling device an elliptical form with its major axis horizontal and at its rear end an elliptical form with its major axis vertical, said tank having a tubular body closed at its ends by a front wall and a rear wall, said coupling device being fixed to said tank body below its front end, the upper surface of said tank being substantially horizontal in driving position and the lower surface sloping from a point above said coupling to a point below a horizontal plane passing through the top of said road wheels.

5. A semi-trailer tank vehicle, comprising a tubular tank body having one end of approximately elliptical cross-section and its other end also of approximately elliptical cross-section, said cross sections having their major axes at right angles to one another, a coupling device secured to and below said tank body adjacent said first-mentioned cross-section and struts secured to said tank body adjacent said last-mentioned cross-section and a set of road wheels movably connected to said struts.

6. A semi-trailer tank vehicle as claimed in claim 5, in which said struts are supported at each side of said tank by a rocking beam to which said road wheels are rotatably mounted, so that at each side of said tank body said road wheels have freedom of movement in planes parallel to the longitudinal center plane of said tank.

References Cited in the file of this patent

UNITED STATES PATENTS

| | | |
|---|---|---|
| 2,160,477 | Kramer | May 30, 1939 |
| 2,362,657 | Meyer | Nov. 14, 1944 |
| 2,362,658 | Meyer | Nov. 14, 1944 |
| 2,606,039 | La Rue | Aug. 5, 1952 |

FOREIGN PATENTS

| | | |
|---|---|---|
| 397,969 | France | May 24, 1909 |
| 659,631 | Great Britain | Oct. 24, 1951 |